United States Patent
Chen et al.

[19]

[11] Patent Number: 6,024,416
[45] Date of Patent: Feb. 15, 2000

[54] WHEEL ASSEMBLY FOR A STROLLER

[75] Inventors: Er-Jui Chen, Kaohsiung; Hung-Chung Hou, Taipao; Ying-Yuan Huang, Chiayi, all of Taiwan

[73] Assignee: Link Treasure Limited, United Kingdom

[21] Appl. No.: 09/090,537

[22] Filed: Jun. 4, 1998

[51] Int. Cl.[7] .................................................. B60B 35/00
[52] U.S. Cl. .............................. 301/121; 301/111; 16/46
[58] Field of Search ..................................... 301/111, 112, 301/118, 119, 120, 121, 122; 16/18 R, 45, 46, 20, 29

[56] References Cited

U.S. PATENT DOCUMENTS

| | | | |
|---|---|---|---|
| 4,043,685 | 8/1977 | Hyaus | 301/121 X |
| 5,507,566 | 4/1996 | Chen | 301/111 |

FOREIGN PATENT DOCUMENTS

| | | | |
|---|---|---|---|
| 242889 | 2/1963 | Australia | 301/121 |
| 708094 | 4/1965 | Canada | 301/121 |
| 1228268 | 8/1960 | France | 301/121 |

*Primary Examiner*—Russell D. Stormer
*Attorney, Agent, or Firm*—Patterson & Keough, P.A.

[57] ABSTRACT

A wheel assembly for a stroller includes a wheel base including a sleeve having an inner periphery containing a passage and an outer periphery transversely containing a cavity connecting to the passage, and an extension having a first end portion extending from the outer periphery of the sleeve and having an inner wall containing a receiving space connecting to the cavity. A wheel is rotatably mounted on a second end portion of the extension. A biasing member is pivotally received in the receiving space and includes a first end portion pressing on the inner wall containing the receiving space and a second end portion formed with a locking hook extending through the cavity into the passage.

5 Claims, 5 Drawing Sheets

6,024,416

WHEEL ASSEMBLY FOR A STROLLER

FIELD OF THE INVENTION

The present invention relates to a wheel assembly, and more particularly to a wheel assembly for a stroller.

BACKGROUND OF THE INVENTION

A conventional wheel assembly for a stroller is shown in FIGS. 4–6, and there will be a complete illustration in the detailed description of the preferred embodiments, concerning the conventional wheel assembly. The conventional wheel assembly is designed such that the locking device distorts during normal operation to such an extent that it is unable to retain the wheel assembly on its spindle or breaks completely. Secondly, the axle and axle housing assembly is designed and fabricated such that the axle tends to vibrate excessively under normal conditions of operation and wear and tear.

The present invention has arisen to mitigate and/or obviate the disadvantage of the conventional wheel assembly.

SUMMARY OF THE INVENTION

In accordance with one aspect of the present invention, there is provided a wheel assembly for a stroller comprising a wheel base including a sleeve having an inner periphery containing a passage and an outer periphery transversely containing a cavity connecting to the passage, and an extension having a first end portion extending from the outer periphery of the sleeve and having an inner wall containing a receiving space connecting to the cavity. At least one wheel is rotatably mounted on a second end portion of the extension.

A biasing member is pivotally received in the receiving space and includes a first end portion pressing on the inner wall containing the receiving space and a second end portion formed with a locking hook extending through the cavity into the passage.

Further features of the present invention will become apparent after a careful reading of the detailed description with appropriate reference to the accompanying drawings.

DETAILED DESCRIPTION OF THE PREFERRED EMBODIMENTS

Figure 4:
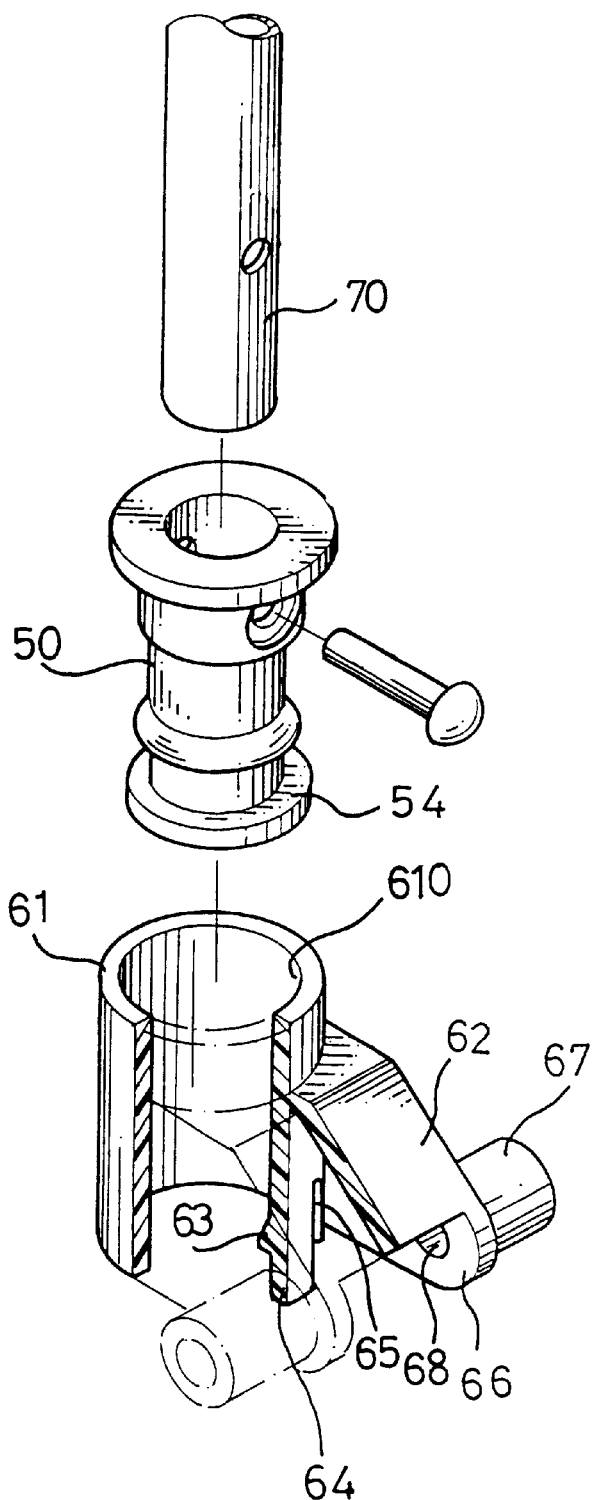
FIG. 4 is a partially cut-away exploded cross-sectional view of a wheel assembly for a stroller in accordance with the prior art.
Figure 5:
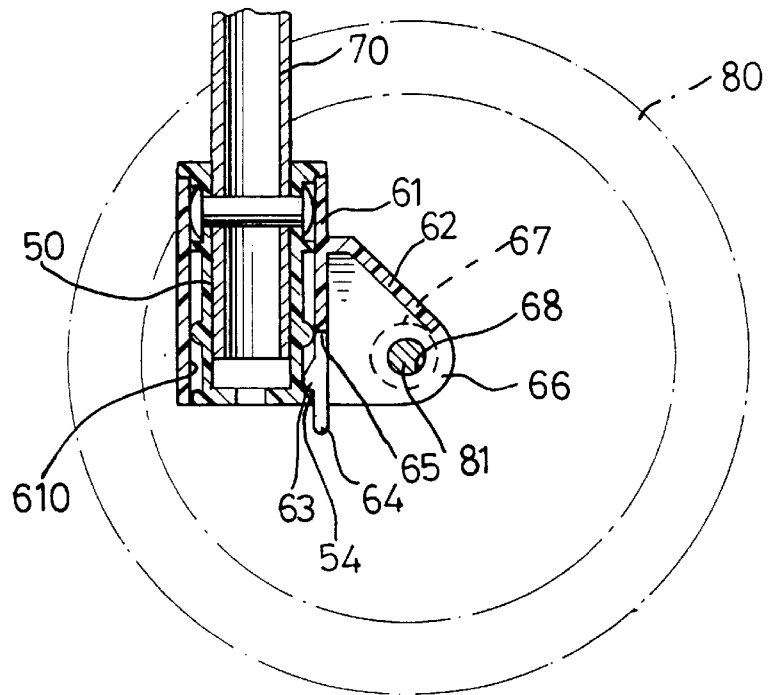
FIG. 5 is a front plan partially cross-sectional assembly view of the wheel assembly as shown in FIG. 4.
Figure 6:
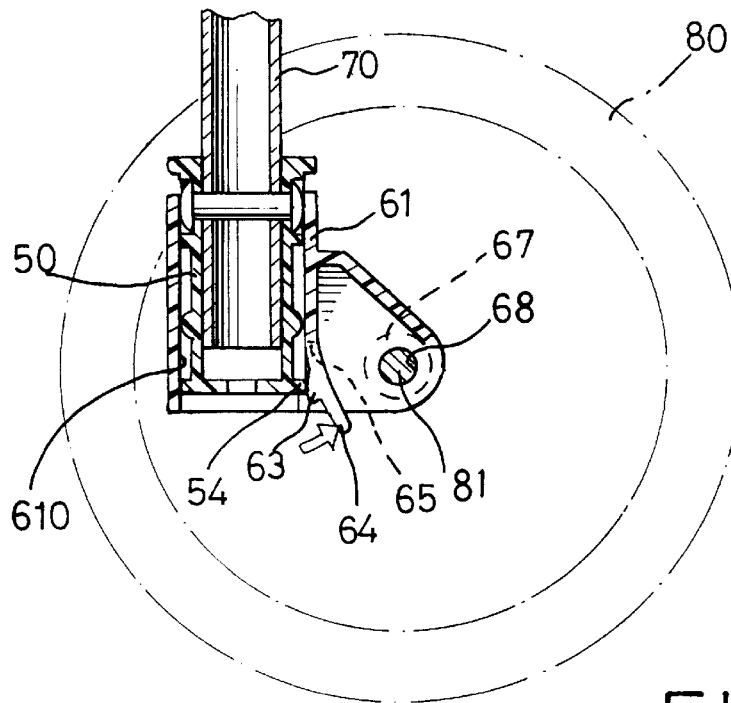
FIG. 6 is an operational view of the wheel assembly as shown in FIG. 5.

For a better understanding of the present invention, reference is made to FIGS. 4–6 illustrating a conventional wheel assembly for a stroller in accordance with the prior art.

The conventional wheel assembly comprises a supporting base 50 secured to a tube 70 connected to a frame (not shown) of the stroller, an annular flange 54 formed on a lower end portion of the supporting base 50, a sleeve 61 containing a passage 610 for receiving the supporting base 50 therein, two slits 65 each defined in a lower end portion of the sleeve 61, a locking plate 64 formed on the lower end portion of the sleeve 61 and located between the two slits 65, a locking hook 63 protruding inwardly from the locking plate 64 and pressed on the annular flange 54, an extension 62 extending from the sleeve 61 and including two side plates 66 each formed with a shaft housing 67 containing a bore 68, a shaft 81 extending through the bore 68 of each of the two shaft housings 67 and including two end portions, and two wheels 80 each rotatably mounted on a corresponding one of the two end portions of the shaft 81.

In operation, the locking plate 64 can be pressed outwardly from a first position as shown in FIG. 5 to a second position as shown in FIG. 6, thereby detaching the locking hook 63 from the annular flange 54 such that the sleeve 61 can be detached from the supporting base 50. By such an arrangement, however, the force is exerted on the locking plate 64 only, thereby easily incurring stress concentration on the locking plate 64 such that it is easily deformed or even disrupted during long-term utilization.

Figure 1:
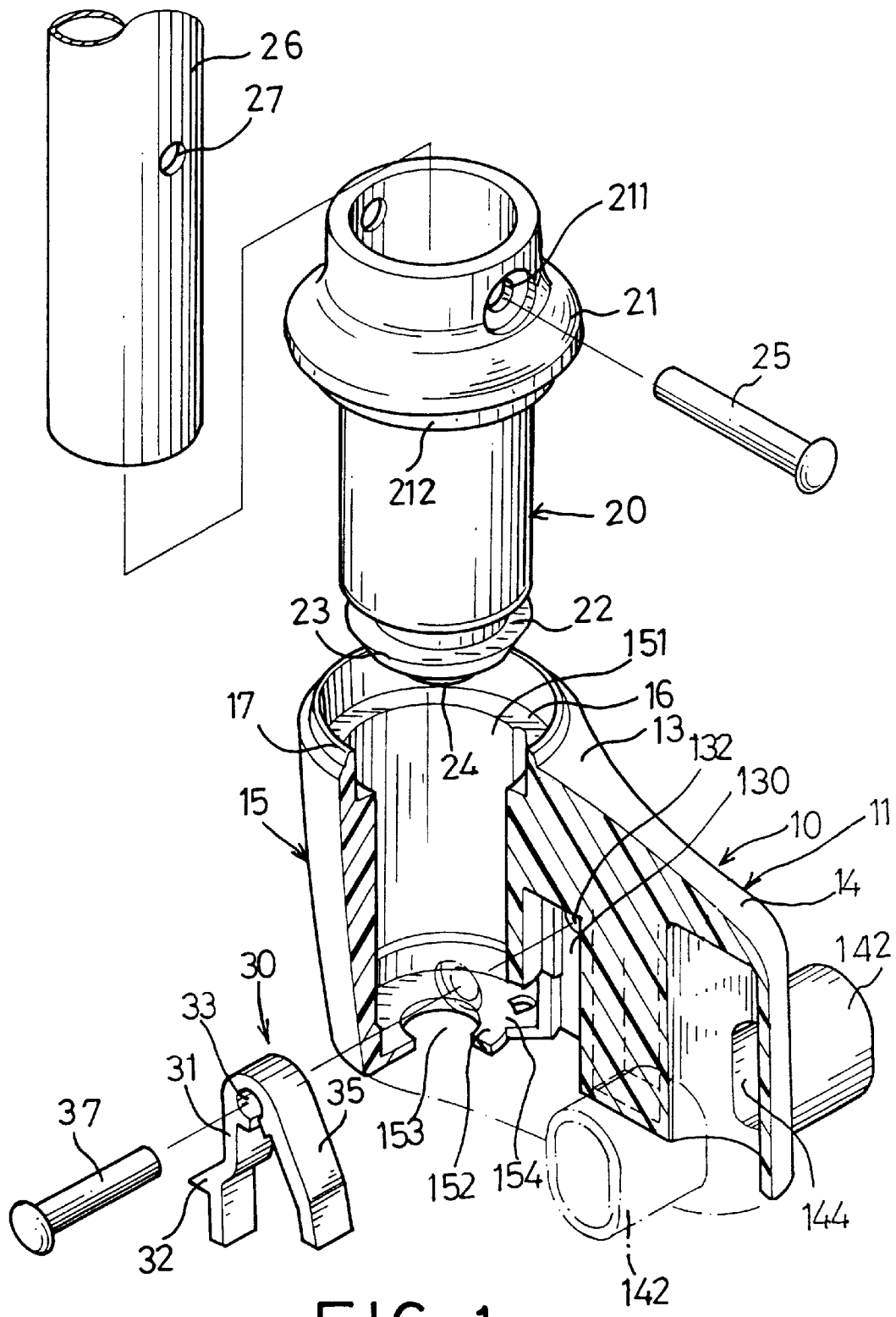
FIG. 1 is a partially cut-away exploded cross-sectional view of a wheel assembly for a stroller in accordance with the present invention.
Figure 2:
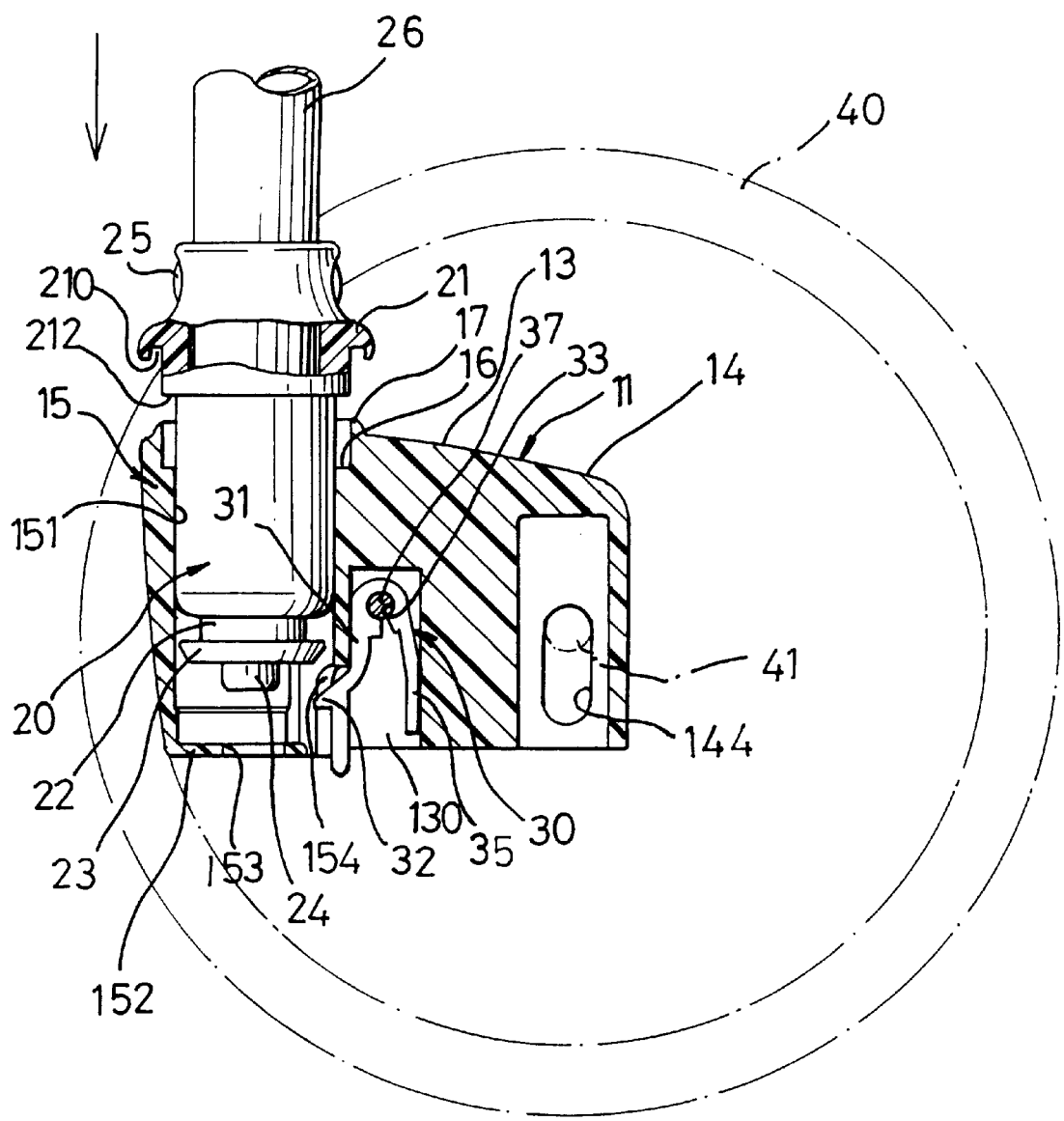
FIG. 2 is a front plan partial cross-sectional assembly view of the wheel assembly as shown in FIG. 1.
Figure 3:
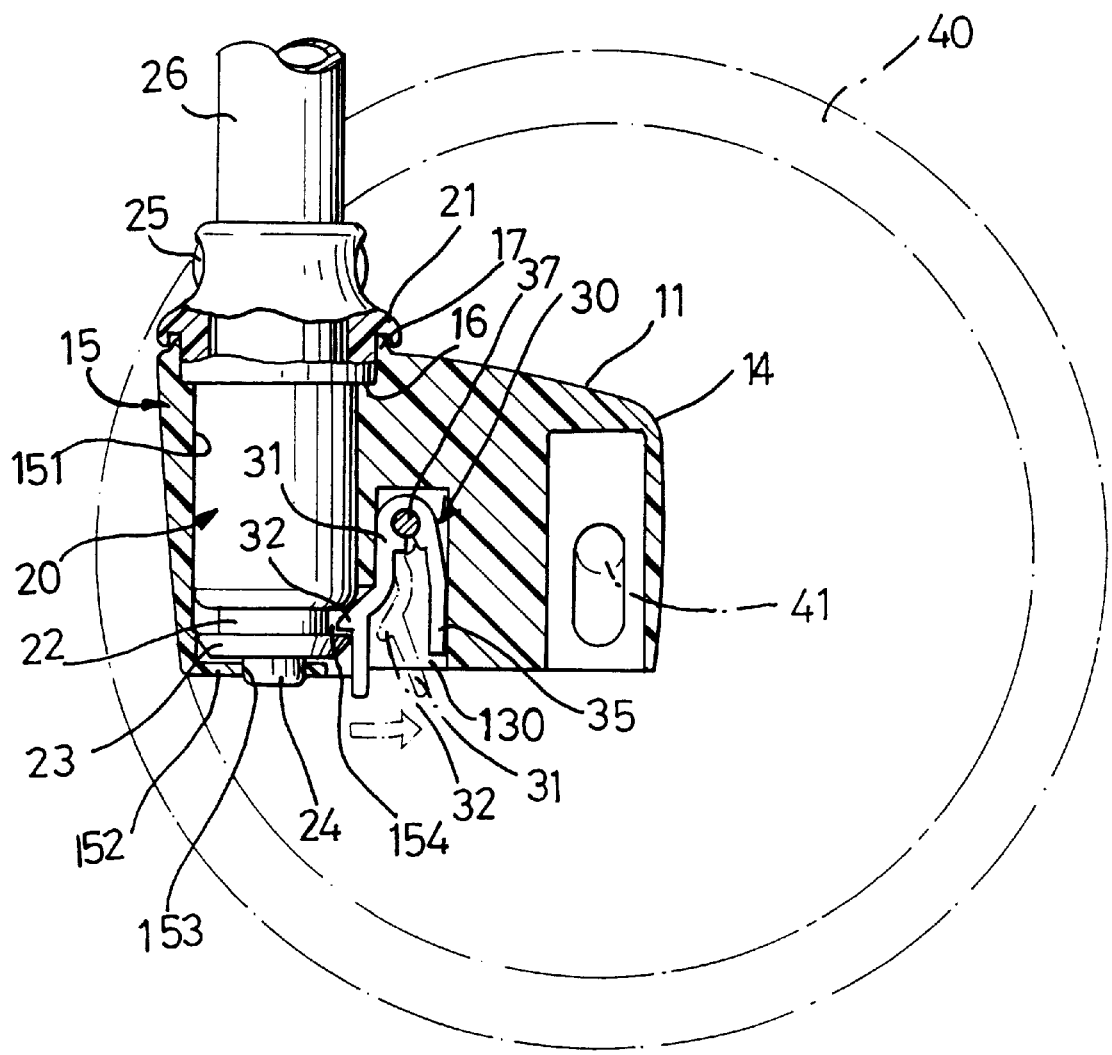
FIG. 3 is an operational view of the wheel assembly as shown in FIG. 2.

Referring now to FIGS. 1–3, a wheel assembly in accordance with the present invention can be adapted to suit a stroller and comprises a wheel base 10 comprising a sleeve 15 including an inner periphery containing a passage 151 along a longitudinal direction thereof and an outer periphery having a lower end portion transversely containing a cavity 154 connecting to the passage 151, and comprising an extension 11 including a first end portion 13 extending from the outer periphery of the sleeve 15 and having an inner wall containing a receiving space 130 connecting to the cavity 154, and including a second end portion 14.

A substantially inverted V-shaped flexible biasing member 30 is pivotally received in the receiving space 130 and includes a first end portion 35 pressing on the inner wall containing the receiving space 130 and a second end portion 31 formed with a locking hook 32 extending through the cavity 154 into the passage 151.

The first end portion 13 of the extension 11 includes two sides each transversely containing a first bore 132 connecting to the receiving space 130. The biasing member 30 defines a second bore 33 aligning with the first bore 132 of each of the two sides of the first end portion of the extension 11. A pivot axle 37 extends through the first bore 132 of each of the two sides of the first end portion 13 of the extension 11 and the second bore 33 of the biasing member 30 such that the biasing member 30 can be pivotally received in the receiving space 130.

A supporting post 20 is detachably received in the passage 151 and includes an upper end portion and a lower end portion formed with an annular flange 23 detachably abutting on the locking hook 32 and containing an annular groove 22 for receiving the locking hook 32.

The sleeve 15 includes a bottom portion 152 containing a retaining hole 153, and the annular flange 23 is formed with a lug 24 received in the retaining hole 153, thereby providing an efficient effect for stably retaining the supporting post 20 in the sleeve 15.

The sleeve 15 includes an upper end portion formed with an annular shoulder 16 radially extending inwardly and formed with an annular lip 17 extending upwardly. The upper end portion of the supporting post 20 is formed with an annular cap 21 abutting on the annular lip 17 and containing an annular groove 210 for receiving the annular lip 17. The upper end portion of the supporting post 20 is also formed with an annular abutting edge 212 abutting on the annular shoulder 16.

A tube 26 is fixedly mounted on the upper end portion of the supporting post 20 and is connected to a frame (not shown) of the stroller. Preferably, a pivot axle 25 in turn extends through holes 211 defined in the upper end portion of the supporting post 20 and a hole 27 defined in a lower end portion of the tube 26, thereby securing the tube 26 on the supporting post 20.

The second end portion 14 of the extension 11 of the wheel base 10 includes two sides each formed with a shaft housing 142 transversely containing a slot 144 therein. A supporting shaft 41 extends through the slot 144 of the shaft housing 142 of each of the two sides of the second end portion 14 of the extension 11 and includes two end portions each protruding outward from the shaft housing 142 on a corresponding one of the two sides of the second end portion 14 of the extension 11. Two wheels 40 are each rotatably mounted on one of the two corresponding end portions of the supporting shaft 41.

In operation, referring to FIGS. 2 and 3 with reference to FIG. 1, the sleeve 15 of the wheel base 10 can be moved upward relative to the sleeve 15 from a first position as shown in FIG. 2 to a second position as shown in FIG. 3 where the locking hook 32 of the biasing member 30 can be depressed to be inserted into the annular groove 22 such that the sleeve 15 can be secured to the supporting post 20 by means of an engagement between the locking hook 32 and the annular flange 23.

Alternatively, especially referring to FIG. 3, the second end portion 31 of the biasing member 30 can be pressed along a direction toward the first end portion 35 thereof so as to move the first position as shown in solid lines to a second position as shown in phantom lines, thereby detaching the locking hook 32 from the annular groove 22 such that the sleeve 15 can be detached from the supporting post 20.

By such an arrangement, the force exerted on the biasing member 30 can be evenly distributed to the first and second end portions 35 and 31 thereof due to the biasing member 30 being mounted independently of the wheel base 10 without a possibility of stress concentration, thereby increasing the life of the biasing member 30.

It should be clear to those skilled in the art that further embodiments may be made without departing from the scope and spirit of the present invention.

What is claimed is:

1. A wheel assembly for a stroller comprising:
    a wheel base (10) comprising:
        a sleeve (15) including an inner periphery containing a passage (151) and an outer periphery transversely containing a cavity (154) connecting to the passage (151); and
        an extension (11) including a first end portion (13) extending from the outer periphery of the sleeve (15) and having an inner wall containing a receiving space (130) connecting to the cavity (154), and including a second end portion (14);
    at least one wheel (40) rotatably mounted on the second end portion (14) of the extension (11); and
    a biasing member (30) pivotally received in the receiving space (130) and including a first end portion (35) pressing on the inner wall containing the receiving space (130) and a second end portion (31) formed with a locking hook (32) extending through the cavity (154) into the passage (151).

2. The wheel assembly in accordance with claim 1, further comprising a supporting post (20) received in the passage (151) and including a lower end portion formed with a flange (23) abutting on the locking hook (32) and containing a groove (22) for receiving the locking hook (32).

3. The wheel assembly in accordance with claim 2, wherein the sleeve (15) includes a bottom portion (152) containing a retaining hole (153), and the flange (23) is formed with a lug (24) received in the retaining hole (153).

4. The wheel assembly in accordance with claim 2, further comprising a tube (26) fixedly mounted on an upper end portion of the supporting post (20).

5. The wheel assembly in accordance with claim 1, wherein the first end portion (13) of the extension (11) includes two sides each transversely containing a first bore (132) connecting to the receiving space (130), the biasing member (30) defines a second bore (33) aligning with the first bore (132) of each of the two sides of the first end portion of the extension (11), and the wheel assembly further comprises a pivot axle (37) extending through the first bore (132) and the second bore (33) such that the biasing member (30) can be pivotally received in the receiving space (130).

* * * * *